United States Patent
Sethumadhavan et al.

(10) Patent No.: US 10,989,784 B2
(45) Date of Patent: Apr. 27, 2021

(54) BEACON-BASED ASSET LOCATION AND MANAGEMENT

(71) Applicant: ThoughtWorks Technologies India Private Limited, Bangalore (IN)

(72) Inventors: Sathyan Sethumadhavan, Karnataka (IN); Atul Bhogendra Kumar, Karnataka (IN); Sharanya Kowlali, Andhra Pradesh (IN)

(73) Assignee: THOUGHTWORKS TECHNOLOGIES INDIA PRIVATE LIMITED, Bangalore (IN)

( * ) Notice: Subject to any disclaimer, the term of this patent is extended or adjusted under 35 U.S.C. 154(b) by 9 days.

(21) Appl. No.: 16/566,333

(22) Filed: Sep. 10, 2019

(65) Prior Publication Data

US 2021/0072337 A1    Mar. 11, 2021

(51) Int. Cl.
*G01S 1/04*     (2006.01)
*H04W 4/029*    (2018.01)
(Continued)

(52) U.S. Cl.
CPC ........ *G01S 1/0428* (2019.08); *G06F 16/2246* (2019.01); *H04B 17/318* (2015.01);
(Continued)

(58) Field of Classification Search
None
See application file for complete search history.

(56) References Cited

U.S. PATENT DOCUMENTS 8,320,939 B1 * 11/2012 Vincent ............... G01S 19/48
                                                   455/456.1
9,591,570 B2 *  3/2017 Kubo .................. H04W 4/029
(Continued)

FOREIGN PATENT DOCUMENTS

| JP | 2011017685 A  | 1/2011 |
| JP | 2016048205 A  | 4/2016 |
| WO | 2017113122 A1 | 7/2017 |

OTHER PUBLICATIONS

International Search Report and Written Opinion for related International Application No. PCT/IN19/50662; action dated Jan. 29, 2020; (7 pages).

*Primary Examiner* — Lonnie V Sweet
(74) *Attorney, Agent, or Firm* — K&L Gates LLP

(57) ABSTRACT

Methods and systems for tracking asset locations within a facility are disclosed. In one embodiment, a system is provided that includes nodes and a gateway. The nodes may receive beacon transmissions containing beacon identifiers from beacons associated with assets. The nodes may transmit a node transmission including a beacon identifier, a node identifier of the node, and a signal strength of received beacon transmissions. The gateway may receive node transmissions and identify node transmissions that share a common beacon identifier. The gateway may then determine a location of the beacon associated with the common beacon identifier by identifying floors associated with nodes that received a beacon transmission from the beacon. The gateway may also select a beacon floor with the most nodes that received a beacon transmission from the beacon and may select a closest node from among the nodes on the beacon floor with the highest signal strength.

18 Claims, 6 Drawing Sheets

(51) Int. Cl.
*G06F 16/22* (2019.01)
*H04B 17/318* (2015.01)
*H04L 12/66* (2006.01)
*H04W 72/04* (2009.01)

(52) U.S. Cl.
CPC ............. *H04L 12/66* (2013.01); *H04W 4/029* (2018.02); *H04W 72/0406* (2013.01)

(56) References Cited

U.S. PATENT DOCUMENTS

| | | | |
|---|---|---|---|
| 2015/0379576 A1* | 12/2015 | Otis | G06Q 30/0277 |
| | | | 705/14.53 |
| 2016/0063428 A1* | 3/2016 | Durg | G06Q 10/063114 |
| | | | 705/7.15 |
| 2017/0082726 A1* | 3/2017 | Gassion | G06Q 10/20 |
| 2017/0188327 A1* | 6/2017 | Shvodian | H04W 64/00 |
| 2017/0270776 A1* | 9/2017 | Wu | G08B 25/10 |
| 2017/0371322 A1* | 12/2017 | Lake | G01S 5/00 |
| 2018/0077535 A1* | 3/2018 | Todeschini | H04W 4/80 |
| 2019/0277939 A1* | 9/2019 | Li | G01S 5/02 |

* cited by examiner

BEACON-BASED ASSET LOCATION AND MANAGEMENT

BACKGROUND

Organizations and business often make available certain assets, such as technological assets including computers, tablets, smartphones, wearables, and computing peripherals. Individuals, such as employees of the business, may utilize these assets in the course of operations (e.g., to develop and test programs or products that utilize the assets). For example, individuals may check the assets out for set periods of time (e.g., a certain number of days or hours) or for use in certain locations (e.g., within the bounds of a facility or office building).

These assets may represent significant value for the organization, so it may be necessary to monitor the assets location to ensure that the assets remain within authorized areas (e.g., facilities or premises of the organization). Additionally, asset locations may need to be monitored to ensure that individuals comply with usage policies and do not continue using assets past authorized periods of time, so that the assets are available to other individuals that require them. Further, if an asset is lost (e.g., within a facility), monitoring the asset's location may enable quicker and easier location and retrieval of the asset.

SUMMARY

The present disclosure presents new and innovative systems and methods for tracking asset locations using beacons. In one embodiment, a system is provided comprising a plurality of nodes configured to receive beacon transmissions from a plurality of beacons, wherein the beacons are associated with a plurality of assets and the beacon transmissions contain a beacon identifier and transmit a node transmission including a beacon identifier, node identifier, and signal strength responsive to receiving a beacon transmission. The system may further comprise a gateway configured to receive a plurality of node transmissions from the plurality of nodes, identify a subset of the node transmissions that include a common beacon identifier, and determine a location of a beacon of the plurality of beacons associated with the common beacon identifier. The gateway may configured to determine the location of the beacon by extracting a plurality of node identifiers associated with the subset of the node transmissions, identifying one or more floors associated with the plurality of node identifiers, and selecting a beacon floor of the one or more floors with the most associated node identifiers. The gateway may be further configured to determine the location of the beacon by selecting a closest node identifier with the largest signal strength from among one or more of the plurality of node identifiers associated with the beacon floor and determining the location of the beacon as a location associated with the node of the plurality of nodes identified by the closest node identifier.

In another embodiment, the gateway is further configured, when determining the location of the beacon, to generate a beacon location tree that subdivides the plurality of node identifiers according to one or more floor identifiers associated with the plurality of node identifiers.

In a further embodiment, the gateway is configured, when generating the beacon location tree, to set the common beacon identifier as a parent node of the tree, to set each of the one or more floor identifiers as floor nodes of the common beacon identifier, and to set, for each floor identifier, node identifiers associated with the floor identifier as subnodes of the floor identifier.

In yet another embodiment, each of the plurality of nodes are configured to receive a plurality of wireless signals, filter the plurality of wireless signals to identify a beacon transmission, determine a signal strength for the beacon transmission, and transmit the beacon identifier, the signal strength, and a node identifier of the node to the gateway.

In a still further embodiment, each of the plurality of nodes receives the plurality of wireless signals over a node cycle period and filters the plurality of wireless signals at the end of the node cycle period.

In another embodiment, the node cycle period is less than or equal to 2 minutes.

In a further embodiment, the plurality of wireless signals includes a plurality of beacon transmissions including a plurality of beacon identifiers, and each of the nodes are configured to determine the plurality of signal strengths corresponding to the plurality of beacon transmissions and transmit each of the beacon identifiers of the beacon transmission in association with a corresponding signal strength of the plurality of signal strengths and the node identifier of the node.

In yet another embodiment, at least a subset of the beacon identifiers are transmitted together.

In a still further embodiment, the nodes are configured to transmit the node transmission according to the message queuing telemetry transport (MQTT) protocol.

In another embodiment, the gateway is configured to receive the plurality of node transmissions over a gateway cycle period.

In a further embodiment, the gateway cycle period is less than or equal to 10 minutes and is preferably less than or equal to 5 minutes.

In yet another embodiment, the gateway is further configured to transmit a gateway transmission including beacon identifiers and associated beacon locations. The system may also include a cloud server configured to receive a plurality of gateway transmissions during a cloud server cycle period and determine a final location for beacons based on a most common beacon location associated with the corresponding beacon identifiers.

In a still further embodiment, a method is provided comprising receiving, at a plurality of nodes, beacon transmissions from a plurality of beacons, where the beacons are associated with a plurality of assets and the beacon transmissions contain a beacon identifier, transmitting, from the plurality of nodes, a plurality of node transmissions, each node transmission including a beacon identifier, a node identifier, and a signal strength responsive to receiving the beacon transmissions. The method may further comprise receiving, at a gateway, the plurality of node transmissions from the plurality of nodes, identifying a subset of the node transmissions that include a common beacon identifier, and determining a location of a beacon of the plurality of beacons associated with the common beacon identifier. Determining the location of the beacon may include extracting a plurality of node identifiers associated with the subset of the node transmissions, identifying one or more floors associated with the plurality of node identifiers, and selecting a beacon floor of the one or more floors with the most associated node identifiers. Determining the location of the beacon may further include selecting a closest node identifier with the largest signal strength from among one or more of the plurality of node identifiers associated with the beacon floor and determining the location of the beacon as a location associated with the node of the plurality of nodes identified by the closest node identifier.

In another embodiment, determining the location of the beacon further comprises generating a beacon location tree that subdivides the plurality of node identifiers according to one or more floor identifiers associated with the plurality of node identifiers.

In a further embodiment, generating the beacon location tree comprises setting the common beacon identifier as a parent node of the tree, setting each of the one or more floor identifiers as floor nodes of the common beacon identifier, and setting, for each floor identifier, node identifiers associated with the floor identifier as subnodes of the floor identifier.

In yet another embodiment, receiving the beacon transmissions and transmitting the plurality of node transmissions further comprises receiving a plurality of wireless signals, filtering the plurality of wireless signals to identify the beacon transmission, determining the signal strength for the beacon transmission, and transmitting the beacon identifier, the signal strength, and a node identifier of the node to the gateway.

In a still further embodiment, the plurality of wireless signals includes a plurality of beacon transmissions including a plurality of beacon identifiers. The method may also further comprise determining the plurality of signal strengths corresponding to the plurality of beacon transmissions and transmitting each of the beacon identifiers associated with a corresponding signal strength of the plurality of signal strengths and the node identifier of the node.

In another embodiment, at least a subset of the beacon identifiers are transmitted together.

In a further embodiment, the method further comprises transmitting gateway transmissions including beacon identifiers and associated beacon locations, receiving, at a cloud server, a plurality of gateway transmissions during a cloud server cycle period, and determining a final location for beacons based on a most common beacon location associated with the corresponding beacon identifiers.

In a still further embodiment, a method is provided comprising receiving, at a gateway, a plurality of node transmissions including a corresponding beacon identifier, node identifier, and signal strength, identifying a subset of the node transmissions that include a common beacon identifier, and generating a beacon location tree for the common beacon identifier. The method may further include generating a beacon location tree for the common beacon identifier by extracting a plurality of node identifiers associated with the subset of the node transmissions, identifying one or more floor identifiers associated with the plurality of node identifiers, setting the common beacon identifier as a parent node of the tree, setting each of the one or more floor identifiers as floor nodes of the common beacon identifier, and setting, for each floor identifier, node identifiers associated with the floor identifier as subnodes of the floor identifier. The method may further include determining a location of a beacon of the plurality of beacons associated with the common beacon identifier based on the beacon location tree by selecting a beacon floor corresponding to the floor node with the largest number of subnodes, selecting a closest node identifier corresponding to the node identifier of the subnode of the beacon floor with the largest signal strength, and determining the location of the beacon as a location associated with the node of the plurality of nodes identified by the closest node identifier.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

One technique for monitoring asset locations within a facility as described above is to affix beacons to the assets. The beacons may emit transmissions at regular intervals that are received by nodes distributed throughout the facility. The nodes may be stationary and therefore have an unchanging location, so the beacon may be located based on the nodes that receive the beacon's transmission. For example, if one node receives the beacon's transmission, that beacon is likely near that node and may therefore be assigned the same location as the node. In this way, the beacon's location can be monitored over time and, correspondingly, a location of the asset to which the beacon is attached can be determined.

However, in such systems, the beacon's transmission may be received by more than one node at the same time. For example, two or more nodes can have overlapping service areas and may therefore receive transmissions from beacons located in the overlapping portion of the service area. A location for the beacon may therefore be required to be selected from the locations of the multiple nodes that received the beacon's transmission. Conventionally, simple heuristics may be used to select the node that best represents the beacon's location. For example, the first node to receive the beacon's transmission may be selected. However, such heuristics do not incorporate information received from the collection of nodes as a whole and may therefore fail to accurately determine the correct node and therefore the correct location of the beacon and asset.

One solution to this problem is to analyze the signals received from the nodes as a whole. For example, the nodes may transmit indications of all beacons from which transmissions have been received. These indications can then be analyzed to identify one or more beacon identifiers common to multiple nodes. The nodes for each common beacon identifier can then be collectively analyzed, for example, by building a tree data structure that indicates the relationships between the nodes. In such implementations, the tree may sort the nodes according to the floor of a facility on which the nodes are located. This sorting may enable a more collective analysis of the nodes receiving the beacon indications. For example, the tree may then be analyzed on floor-by-floor basis to identify which floor has the most nodes receiving transmissions from the beacon. This floor may then be selected as the floor on which the beacon is located, and the location of the beacon within the floor may be selected from among the nodes on that floor that received the beacon's transmission.

Figure 1:
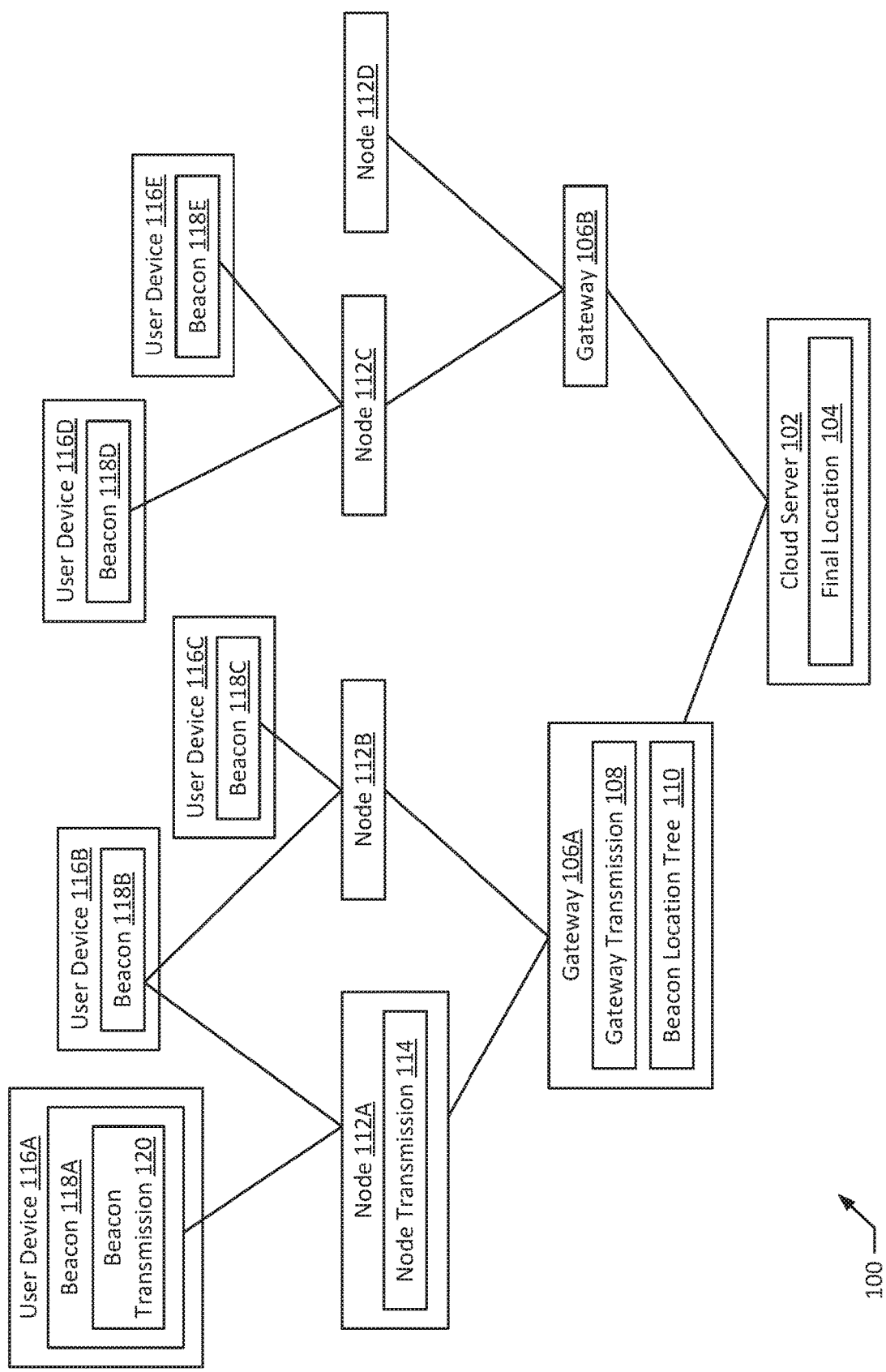
FIG. 1 illustrates a system according to an exemplary embodiment of the present disclosure.

FIG. 1 illustrates a system 100 according to an exemplary embodiment of the present disclosure. The system 100 may be configured to track and monitor the location of user devices 116A-E and related assets, such as the assets discussed above. The system 100 includes user devices 116A-E. The user devices 116A-E may represent one or more assets (e.g., assets for use by employees or members of an organization in the course of performing duties related to the organization). For example, the user devices may includes one or more computing devices, such as computers, tablets, smart phones, or other hardware such as keyboards, mice, cameras, sensors, and displays.

The user devices 116A-E include beacons 118A-E, which may include one or more wireless communication beacons. In a preferred embodiment, the beacons 118A-E may be implemented as Bluetooth® Low Energy (BLE) beacons. In other embodiments, the beacons 118A-D may be implemented according to other wireless standards, including standard Bluetooth®, near-field communication (NFC), Wi-Fi, Zigbee®. In preferred embodiments, the beacons 118A-E may each utilize the same wireless standard (e.g., BLE), and in other embodiments, the beacons 118A-E may utilize different standards (e.g., beacons 118A-C may utilize BLE and beacons 118D-E may utilize NFC). In certain implementations, the beacons 118A-E may be capable of communicating using more than ones wireless communication standard.

The beacons 118A-E may generate and transmit beacon transmissions 120. For example, the beacons 118A-E may generate and transmit beacon transmissions 120 to communicate with the nodes 112A-D, discussed below. For simplicity, only beacon 118A is depicted as containing a beacon transmission 120, although in practice each of the beacons 118A-E may be capable of generating and transmitting beacon transmissions 120. The beacon transmissions may include a beacon identifier that identifies the beacon 118A-E that generated the beacon transmission 120. The beacon identifier and the contents of the beacon transmissions 120 are discussed in greater detail below in connection with FIG. 2. The beacons 118A-E may generate and transmit the beacon transmissions at regular intervals. For example, the beacons 118A-E may transmit a beacon transmission 120, e.g., every 30 seconds, 10 seconds, or 2 seconds. The beacons 118A-E may preferably not be configured to transmit the beacon transmissions 120 to any one of the nodes 112A-D in particular. Rather, the beacons 118A-E may transmit the beacon transmission 120 for reception by all nodes within a communicative range.

The system 100 also includes nodes 112A-D, which may be configured to receive beacon transmissions 120 from the beacons 118A-E and generate node transmissions 114 identifying the received beacon transmissions 120. For simplicity, only node 112A is depicted as including a node transmission 114, but in practice each of the nodes 112A-D may be capable of generating and transmitting node transmissions 114. As depicted for the nodes 112A-C, each node may be capable of receiving beacon transmissions from multiple beacons 118A-E and the node transmission 114 may include information regarding each received beacon transmission 120 (e.g., a signal strength of the beacon transmission 120). The node transmissions 114 are discussed in greater detail below with FIG. 2.

Each node 112A-D may correspond to a particular location. For example, each node 112A-D may correspond to a geofences location within a facility, such as the facility 300 discussed below in FIG. 3. The proximity of a beacon 118A-E may therefore indicate an approximate location of the beacon 118A-E, and therefore the associated user device 116A-E. The nodes 112A-D may be capable of communicating using one or more wired or wireless communication standards. In certain implementations, the nodes 112A-D may be implemented at least in part as an ESP32 system on a chip (SOC).

The nodes 112A-D may be configured to listen or wait for beacon transmissions 120 for a node cycle period (e.g., 10 seconds, 30 seconds, 2 minutes) and may generate a node transmission 114 with information on all or at least a subset of the beacon transmissions 120 received during the set period of time. In preferred embodiments, the nodes may have a node cycle period of 1 to 2 minutes.

The nodes 112A-D may transmit the node transmissions 114 to one or more gateways 106A-B, discussed further below. In certain implementations, the nodes 112A-D may transmit the node transmissions 114 to the gateways 106A-B along one or more physical communication interfaces (e.g., an Ethernet interface). In other implementations, the nodes 112A-D may communicate with the gateways 106A-B along a wireless communication interface (e.g., Wi-Fi®, Bluetooth®, NFC, Zigbee®). In such implementations, the nodes 112A-D may communicate with the gateways using a different wireless communication interface than the beacons 118A-E. The nodes 112A-D may therefore be capable of communication across multiple wireless communication interfaces. In a preferred embodiment, the nodes 112A-D may communicate with the gateways 106A-B via Wi-Fi (e.g., using the message query telemetry transport protocol).

The system 100 also includes gateways 106A-B, which may be configured to receive and process node transmissions 114 from the nodes 112A-B. For example, the gateways 106A-B may generate a beacon location tree 110 that combines information contained within received node transmissions 114. The gateways 106A-B may then analyze the beacon location tree 110 to determine a location for each beacon 118A-E from which at least one beacon transmission 120 was received. For example, the nodes 112A, B may both receive a beacon transmission 120 from the beacon 118B, as depicted. The gateway 106A may therefore analyze the beacon location tree 110 to determine which node 112A, B is closer to the beacon 118B to most accurately locate the beacon 118B. This analysis is discussed further below.

In preferred embodiments, the gateways 106A-B may be implemented as a computing device such as a server computer or personal computer. The gateway 106A-B may be configured to wait for a gateway cycle period (e.g., 1 minute, 5 minutes, 10 minutes, 20 minutes) for node transmissions 114. After the gateway cycle period completes, the gateway 106A-B may then determine a location for each beacon (e.g., by generating a beacon location tree 110 for one or more of the beacons). In preferred embodiments, the gateway cycle period may preferably be between 5 and 10 minutes long.

After determining a location for the beacons 118A-E, the gateway 106A may then generate a gateway transmission 108 indicating the identified location of the beacons 118A-E. The gateway 106A-B may then transmit the gateway transmission 108 to a cloud server 102 along one or more physical or wireless communication interfaces (e.g., one or more of the above-discussed physical or wireless communication interfaces). For simplicity, only gateway 106A is depicted as containing a gateway transmission 108 and a beacon location tree 110, but in practice the gateway 106B may similarly generate a gateway transmission 108 and a beacon location tree 110.

The cloud server 102 may be configured to receive gateway transmission 108 from the gateways 106A-B and may determine a final location 104 for the beacons 118A-E. The cloud server 102 may receive gateway transmissions 108 from the gateways during a cloud server cycle period (e.g., 1 hour, 10 hours, 24 hours). In a preferred implementation, the cloud server cycle period may be between 12 and 24 hours to reduce the occurrence of short-term fluctuations in the beacons' 118A-E locations. The cloud server 102 may determine the final location 104 for a beacon 118A-E based on the locations of the beacons 118A-E determined by the gateways 106A-B for that beacon 118A-E. For example, the cloud server 102 may receive multiple gateway transmissions 108 indicating multiple locations for a given beacon 118A-E during the cloud server cycle period. The cloud server 102 may then determine the final location 104 of the beacon 118A-E based on the most commonly-identified location during the cloud server cycle period.

After determining the final location 104 for the beacons 118A-E indicated in the received gateway transmissions 108, the cloud server 102 may store the final locations of the beacons 118A-E. In certain implementations, the cloud server 102 may also store the final location 104 in association with an identifier of the user device 116A-E. The stored final locations 104 may then be used to provide information to users via a dashboard. The dashboard may provide users with, e.g., current and historical location information of assets such as the user devices 116A-E based on the locations of the beacons 118A-E determined by the nodes 112A-D, the gateways 106A-B, and the cloud server 102. The dashboard may also provide other monitoring services, such as generating alerts if a certain user device 116A-E leaves a premises or facility, generating inventory locations for low inventory levels of certain types of user devices 116A-E, and providing on-demand reporting (e.g., reporting of inventory levels, user device 116A-E usage rates, current locations of user devices 116A-E).

One or more of the beacons 118A-E, nodes 112A-D, gateways 106A-B, and cloud server 102 may be implemented by a computing system. For example, although not depicted, one or more of the beacons 118A-E, nodes 112A-D, gateways 106A-B, and cloud server 102 may contain a processor and a memory that implement at least one operational feature. For example, the memory may contain instructions which, when executed by the processor, cause the processor to implement at least on operational feature of the beacon 118A-E, node 112A-D, gateway 106A-B, and/or cloud server 102.

Figure 2:
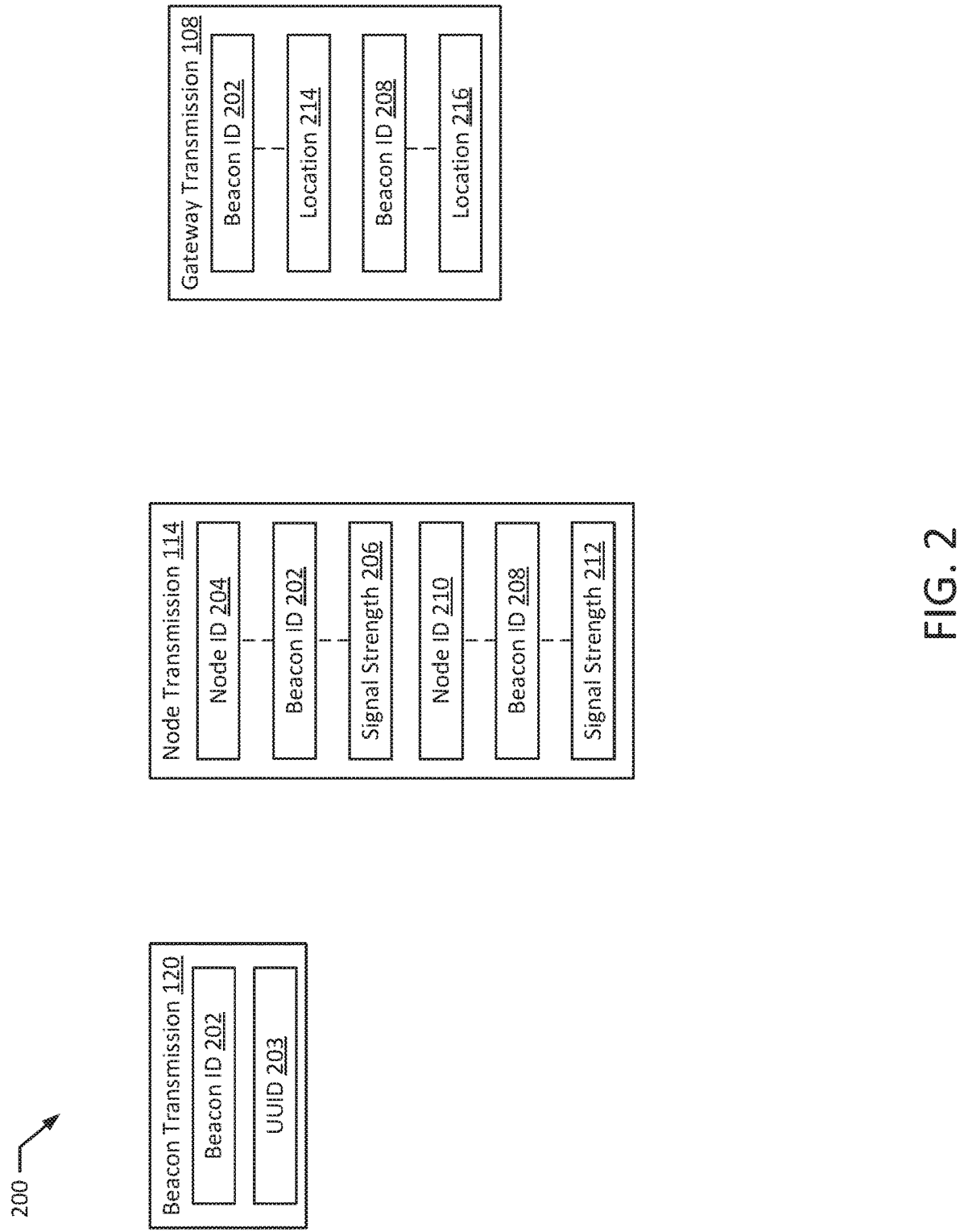
FIG. 2 illustrates transmissions according to an exemplary embodiment of the present disclosure.

FIG. 2 illustrates transmissions 200 according to an exemplary embodiment of the present disclosure. The transmissions 200 include exemplary implementations of the beacon transmission 120, the node transmission 114, and the gateway transmission 108.

The beacon transmission 120 includes a beacon ID 202, which may provide a unique identifier (e.g., a numeric or alphanumeric identifier) of the beacon 118A-E that generated the beacon transmission 120. The beacon ID 202 may be stored in association with a user device 116A-E corresponding to the beacon 118A-E (e.g., to which the beacon 118A-E is attached. For example, this association may be stored by the cloud server 102 for use in providing users information via the dashboard. The beacon transmission 120 may also includes a universally unique identifier (UUID) 203 identifying one or both of the beacon 118A-E and the user device 116A-E with which the beacon 118A-E is associated. In certain implementations, the UUID 203 may also be stored in association with the beacon ID 202 (e.g., by the gateway 106A-B and/or the cloud server 102).

Prior to generating the beacon transmission 120, the user device 116A-E may be associated with a corresponding beacon 118A-E. For example, the beacon 118A-E may be external to the user device 116A-E and may therefore be attached to the user device 116A-E in order to enable monitoring. At the time of attachment, the beacon 118A-E may be associated with the user device 116A-E. The association between the user device 116A-E and the beacon 118A-E may be stored on the cloud server 102 and may be generated via the above-discussed dashboard. In certain implementations, the association may be additionally or alternatively generated via an application such as a smartphone application.

The node transmission 114 contains beacon IDs 202, 208. The beacon IDs 202, 208 may reflect the beacons 118A-E from which the node 112A-D generating the node transmission 114 received beacon transmissions 120. For example, the node 112A generating the node transmission 114 may receive beacon transmission 120 from beacons 118A, B. The beacon ID 202 may therefore correspond to beacon 118A (i.e., the beacon generating the beacon transmission 120) and the beacon ID 208 may correspond to the beacon 118B.

Upon receipt of a beacon transmission 120, the nodes 112A-D may determine a signal strength of the received transmission. When beacon transmissions 120 are received wirelessly, signal strength of received transmissions may indicate a proximity of the beacon 118A-E to the node 112A-D (e.g., higher signal strengths indicate that the beacon 118A-E is closer to the node 112A-D and lower signal strengths indicate that the beacon 118A-E is farther from the node 112A-D). For example, after receiving the beacon transmission 120 from the beacon 118A, the node 114A may determine the signal strength 206 of the beacon transmission 120 and may store the signal strength 206 in association with the beacon ID 202 contained within the beacon transmission 202. Similarly, the node 112A may determine and store a signal strength 212 in association with the beacon ID 208 received from the beacon 118B.

In generating the node transmission 114, the node 112A may include a node ID 204. Similar to the beacon ID 202, the node ID 204 may provide a unique identifier (e.g., a numeric or alphanumeric identifier) of the node 112A-D generating the node transmission 114. The node ID 204 may be stored in the cloud server 102 in association with a location (e.g., a geofenced location) of the node 112A-D.

The gateway transmission 108 includes the beacon IDs 202, 208 and determined locations 214, 216 for each beacon associated with the beacon IDs 202, 208. As discussed above and further discussed below, the gateways 106A-B may determine locations for the beacons based on the received node transmissions 114. For example, the gateways 106A-B may utilize the signal strengths 206, 208, at least in part, to determining the locations 214, 216 of the beacons 118A-E. In certain implementations, the gateway transmission 108 may further include a gateway ID similar to the beacon ID 202 and the node ID 204.

The transmissions 200 depicted in FIG. 2 are merely exemplary and other implementations are possible. In particular, other implementations of the transmissions may include additional information, exclude certain information and/or store information with different associations. For example, although not depicted, one or both of the node transmission 114 and the gateway transmission 108 may, in certain implementations, also contain UUIDs. For example, the node transmission 114 and/or the gateway transmission 108 may store the UUIDs associated with the beacon IDs 202, 208.

Figure 3:
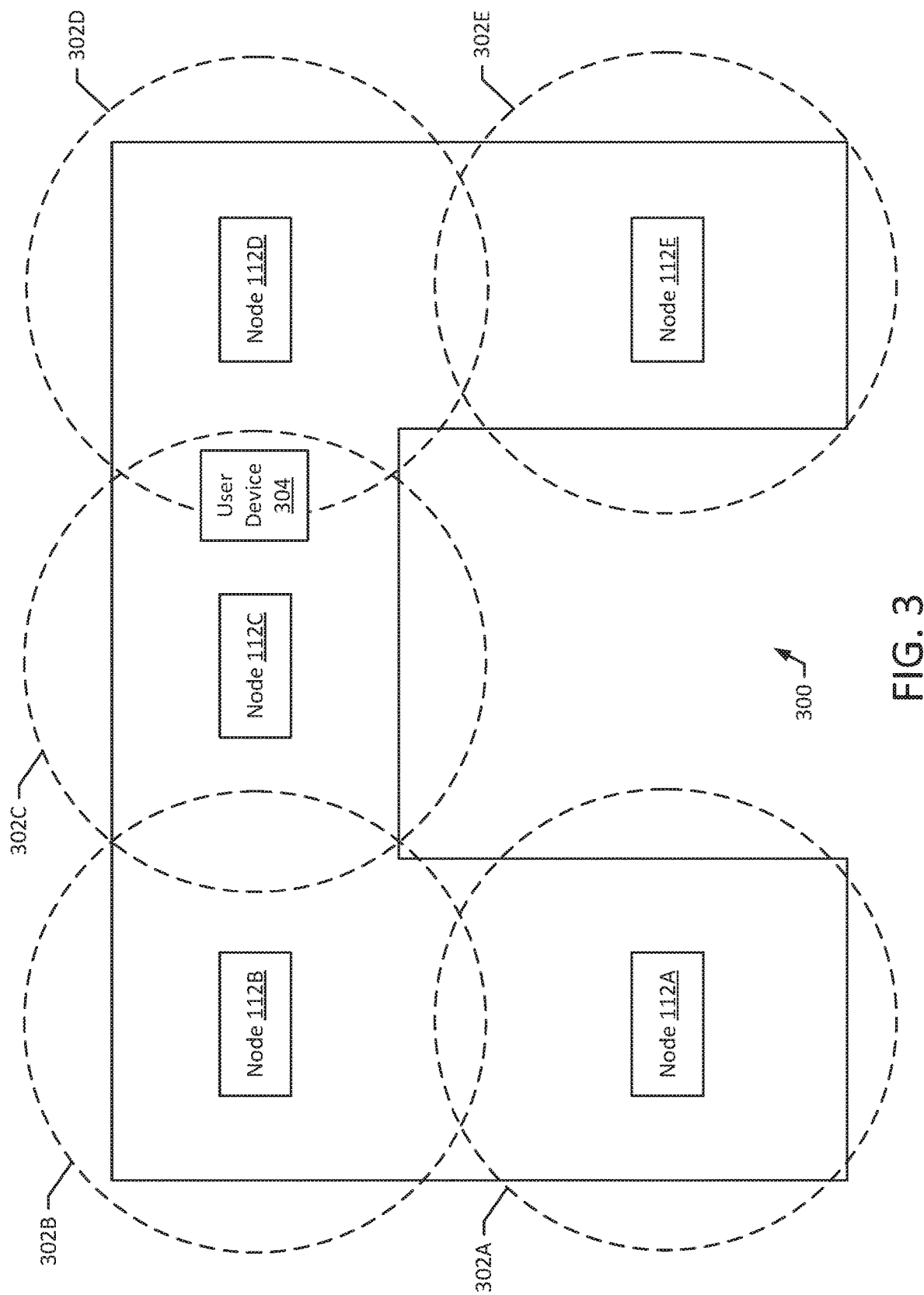
FIG. 3 illustrates a facility according to an exemplary embodiment of the present disclosure.

FIG. 3 illustrates a facility 300 according to an exemplary embodiment of the present disclosure. The facility 300 may be an example deployments of the nodes 112A-D and may include additional nodes, such as node 112E. The facility 300 may be a building, such as a store or office building, in which individuals shop or work. The building may include assets, such as the user device 304, utilized by one or more individuals whose location needs to be tracked. Therefore, the nodes 112A-E may be distributed throughout the facility 300 for the purposes of tracking the location of the assets within the facility 300. As can be seen, each node 112A-E has a corresponding location 302A-E. The locations 302A-E may correspond to a receiving range of the wireless communication interface utilized by the beacons 118A-E when transmitting beacon transmissions 120. For example, where the beacon transmissions 120 are transmitted by BLE, the locations 302A-E may be 30-60 feet across. Each location 302A-E may be stored in association with an identifier of the nodes 112A-E (e.g., the node ID 204) in the data server 102. In certain implementations, the location indication stored on the data server 102 may be stored as a coordinate or other indication of the center of the location 302A-E and/or as a coordinate indicating the location of the node 112A-E itself. In still further implementations, the data server 102 may store an indication of the overall area encompassed by the locations 302A-E (e.g., by the receiving range of the node 112A-E).

Over time, the user device 304, and any associated beacon 118A-E may change location within the facility 300. In doing so, the user device 304 may enter and exit locations 302A-E covered by different nodes 112A-E. For example, the user device 304 is depicted as within the locations 302C, D of the nodes 112C, D. However, the user device 304 may later move so that the user device 304 is only in the location 302D (e.g., to the top right corner of the facility 300). During such movements, beacon transmissions 120 transmitted by a beacon associated with the user device 304 may be received by different combinations of nodes 112A-E. For example, starting out, nodes 112C, D may both receive beacon transmissions 104 from the beacon 118A-E associated with the user device 304, with the node 112C receiving the beacon transmission 120 with a slightly higher signal strength because the user device 304 is slightly closer to the node 112C. After moving, however, only the node 112D may receive the beacon transmission 120. In this example, because the node 112C had a higher signal strength, the user device 304 may be located at location 302C initially. After moving, because only node 112D receives the beacon transmission 120, the user device 304 may be located at location 302D.

As depicted, the facility 300 includes only a single floor. However, in certain implementations, the facility 300 may include multiple floors, each with their own nodes 112A-E. It should be appreciated that the receiving ranges of nodes 112A-E on different floor may overlap and therefore that nodes 112A-E may receive beacon transmissions 120 from beacons 118A-E and user devices located on different floors. It is therefore important that subsequent processing account for and filter such cross-floor transmissions.

Furthermore, the facility 300 as depicted includes five nodes 112A-E for simplicity and clarity of discussion. In practice, such facilities may have many more nodes with many more intersecting receiving areas. For example, in certain implementations, nodes may intersect with 2, 3, 4, or more other nodes' receiving areas. Beacons in these intersecting regions may therefore transmit beacon transmissions 120 that are received by many (e.g., 3, 4, or 5) nodes. It is therefore also important that subsequent processing also account for these intersecting regions. Furthermore, facilities may have dozens, hundreds, or more beacons nodes, so any such processing solution must scale to determine beacon locations in a timely manner.

Figure 4:
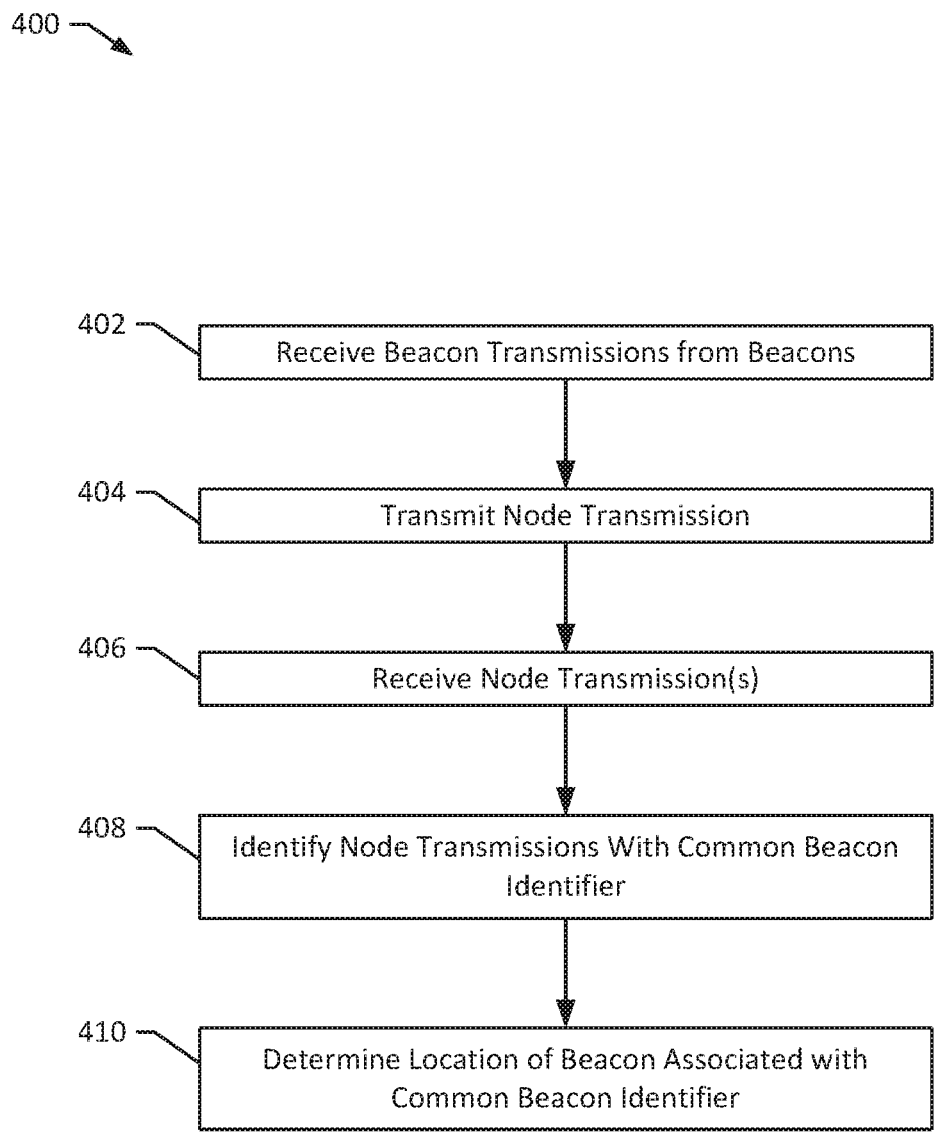
FIG. 4 illustrates a method according to an exemplary embodiment of the present disclosure.

FIG. 4 illustrates a method 400 according to an exemplary embodiment of the present disclosure. The method 400 may be performed to receive and process beacon transmissions 120 received from beacons 118A-E. The method 400 may be performed by a computer system, such as the system 100 For example, the method 400 may be implemented by one or more nodes 112A-E, gateways 106A-B, and cloud servers 102. The method 400 may also be implemented by a set of instructions stored on a computer readable medium that, when executed by a processor, cause the computer system to perform the method. Although the examples below are described with reference to the flowchart illustrated in FIG. 4, many other methods of performing the acts associated with FIG. 4 may be used. For example, the order of some of the blocks may be changed, certain blocks may be combined with other blocks, one or more of the blocks may be repeated, and some of the blocks described may be optional.

The method 400 may begin with receiving beacon transmissions from beacons (block 402). For example, a node 112A-E may receive one or more beacon transmissions from one or more beacons 118A-E associated with user devices 116A-E or other assets whose locations are tracked. While receiving beacon transmissions 120, the node 112A-E may receive multiple types of wireless signals, such as multiple wireless packets (e.g., Bluetooth® packets). The node 112A-E may then filter the received wireless signals to identify the beacon transmission 120 (e.g., by identifying the packet(s) with a beacon ID 202 and/or a UUID 203). As described above, in certain implementations, the node 112A-E may wait for a node cycle period to receive beacon transmissions from one or more beacons 118A-E. During the node cycle period, the node may receive multiple beacon transmissions 120 from the same beacon 118A-E. In such instances, at the end of the node cycle period, the node 112A-E may determine the signal strength for the beacon 118A-E by taking an average signal strength for all of the beacon transmissions 120 received during the node cycle period.

The node may then transmit a node transmission (block 504). For example, the node 112A-E may transmit a node transmission 114 to at least one of the gateways 106A-B. As depicted in FIG. 2, the node 112A may generate a node transmission 114 that includes one or more beacon IDs 202, 208 corresponding to one or more received beacon transmissions 120 (e.g., beacon transmissions 120 received during the cycle period), along with an associated signal strength 206, 212 and a node ID 204 identifying the node 112A-E.

The method 400 may then proceed with receiving node transmissions (block 406). For example, a gateway 106A-B may receive the node transmission 114 from the node 112A-E (e.g., via a wireless network interface). As explained above, the gateway 106A-B may receive node transmissions during a gateway cycle period for subsequent processing (e.g., during the method 400).

The method 400 may then proceed with identifying two or more node transmissions with a common beacon identifier (block 408). For example, the gateway 106A-B may identify two or more node transmissions 114 with a common beacon identifier. In certain instances, a gateway 106A-B may receive node transmissions 114 from two separate nodes 112A-E that received beacon transmissions 120 from the same beacon 118A-E. For example, the gateway 106A may receive node transmissions 114 from the nodes 112A, B, which may have both received beacon transmissions 120 from the beacon 118B associated with the user device 116B. As depicted in FIG. 2, the node transmission 114 received from each node 112A-E may include beacon IDs 202, 208 extracted from received beacon transmissions 120. Therefore, the node transmission 114 received from each node 112A, B that received a beacon transmission 118B may, in such implementations, include a beacon ID 202, 208 corresponding to the beacon 118B. The gateway 106A-B may therefore identify the beacon ID 202, 208 corresponding to the beacon ID 118B as a common beacon identifier because it was included in more than one node transmission 114 and may identify the node transmissions 114 received from the nodes 112A, B as the node transmissions containing the common beacon identifier.

The method 400 may then proceed with determining a location of the beacon associated with the common beacon identifier (block 410). For example, the gateway 410 may determine a location of the beacon 118A-E associated with the common beacon identifier (e.g., associated with the common beacon identifier in the data server 102. In general, as discussed previously, if only a single node 112A-E receives a beacon transmission from a beacon 118A-E, the location of the beacon 118A-E may be determined as the location of the receiving node 112A-E. However, if more than one node 112A-E receives a beacon transmission from a beacon 118A-E, the gateway 106A-B may have to select one of the locations of one of the nodes 112A-E as the location of the beacon 118A-E. The gateway 106A-B may therefore have to determine which node 112A-E is closest to the beacon 118A-E corresponding to the common beacon identifier. For example, the gateway 106A-B may analyze the signal strengths 206, 212 associated with the common beacon identifier to determine which node 112A-E is closest. The gateway 106A-B may then select the node ID 204 associated with the node 204 with the largest signal strength indicated in the node transmission 114 and may determine the location of the beacon as a geofenced location (e.g., the location 302A-E) associated with the node ID 204 (e.g., stored in the cloud server 102. In certain implementations, the gateway 106A-B may make this determination, as described above, and in other implementations, the cloud server 102 may make this determination. For example, the gateway 106A-B may transmit the node ID 204 to the cloud server 102, which may then identify a location associated with the node ID 204 and determine that the associated location is the location of the beacon 118A-E.

Figure 5:
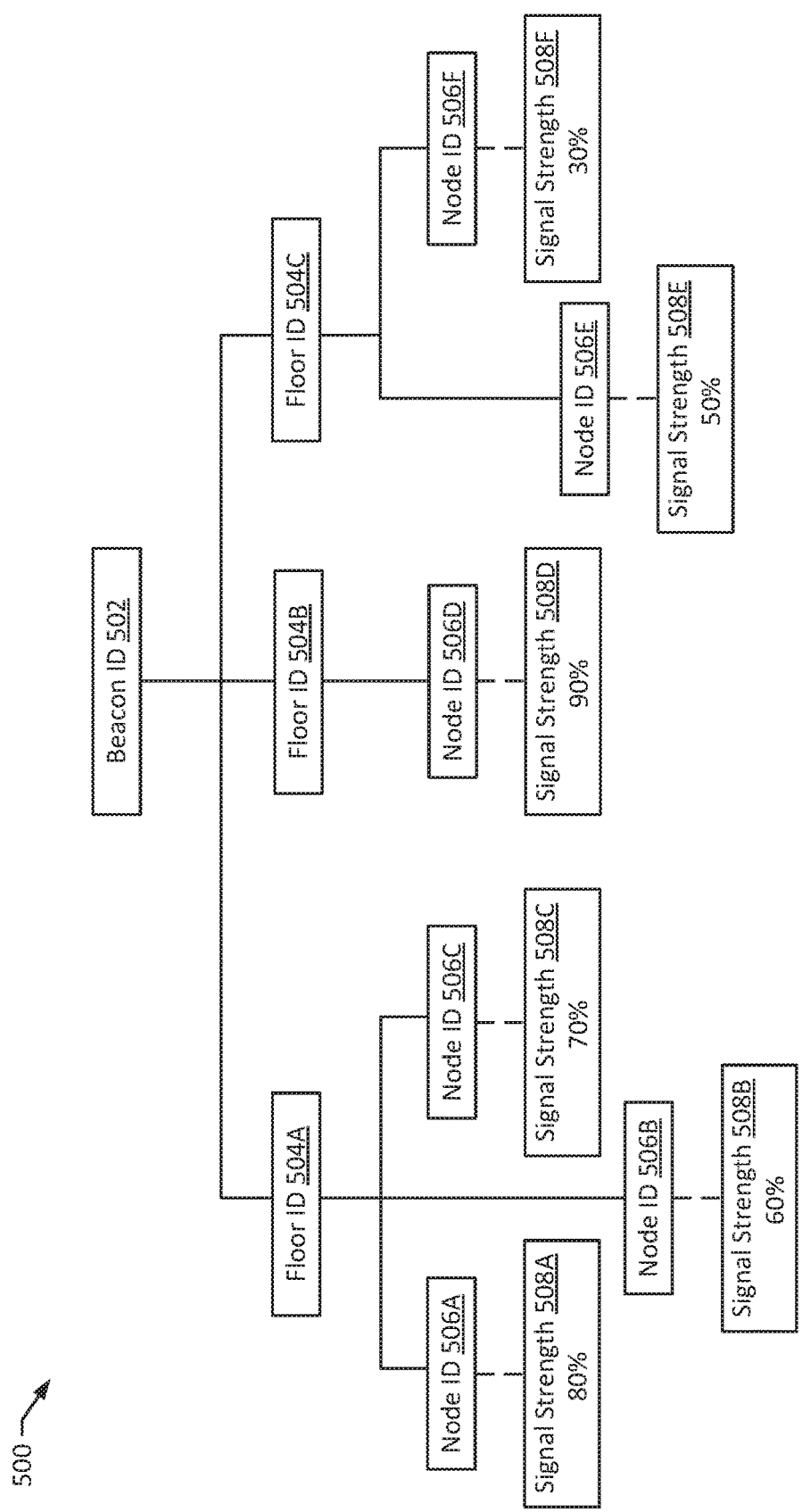
FIG. 5 illustrates a beacon location tree according to an exemplary embodiment of the present disclosure.

The gateway 106A-B may additionally generate a beacon location tree 110 to select between the nodes 112A-E from which node transmissions 114 were received containing the common beacon identifier. For example, FIG. 5 illustrates a beacon location tree 500 according to an exemplary embodiment of the present disclosure. The beacon location tree 500 may be generated to subdivide received node IDs 204, 506A-F according to one or more associated floor IDs 504A-C. For example, facilities 300 may include many nodes 112A-E distributed across multiple floors of the facility 300 and beacon transmissions 120 may be received by multiple nodes 112A-E, including nodes 112A-E on the same floor and nodes 112A-E on different floors. Subdividing the nodes 112A-E within the beacon location tree 500 may therefore enable the gateway 106A-B to identify the node 112A-E closest to each beacon in a scalable way. In certain implementations, a beacon location tree 500 may be generated for each beacon 118A-E for which a beacon transmission 120 was received. In other implementation, a beacon location tree 500 may only be generated for beacons 118A-E that correspond to a common beacon identifier (e.g., for which multiple beacon transmissions 120 were received by different nodes 112A-E).

The beacon location tree 500 includes a beacon ID 502 at the top. The beacon ID 502 corresponds to the beacon 118A-E whose location is being determined. The gateway 106A-B may identify the beacon ID 502 by determining that more than one node transmission 114 include the same beacon ID 202, 208 (e.g., the common beacon identifier of the method 400). The gateway 106 may then extract and generate the beacon location tree 500 for the beacon ID 502.

The beacon location tree also includes a plurality of node IDs 506A-F, which correspond to the nodes that transmitted a node transmission 114 to the gateway 106A-B that included the beacon ID 502. As depicted, the gateway received six node transmissions 114 containing the beacon ID 502 from six nodes corresponding to the node IDs 506A-F. Each of the node IDs 506A-F has a corresponding signal strength 508A-F, which may be extracted from the node transmission 114 and may indicate a signal strength for the beacon transmission 120 received by each node that contained the beacon ID 502, as discussed above.

The nodes corresponding to the node IDs 506A-F may be distributed across multiple floors of the facility. Therefore, the gateway 106A-B may determine a floor ID 504A-C corresponding to each node ID 506A-F. For example, the gateway 106A-B may store a database identifying a floor ID 504A-C for each node 112A-E communicatively coupled to the gateway 106A-B (e.g., as part of the locations 302A-E stored in association with the node IDs 506A-F). In other implementations, the gateway 106A-B may query the data server 102 for floor information regarding the node IDs 506A-F. The floor IDs 504A-C may identify a floor of the facility on which the nodes corresponding to the node IDs 506A-F are located. Therefore, since the nodes IDs 506A-C share a floor ID 504A, the nodes corresponding to the node IDs 506A-C are located on the same floor of the facility 300. Similarly, the node IDs 506E-F share a floor ID 504C and their corresponding nodes are located on the same floor of the facility 300.

To assemble the beacon location tree 500, the gateway 106A-B may arrange the beacon ID 502 at the top, with the floor IDs 504A-C as subnodes of the beacon ID 502, indicating which floors of the facility 300 include nodes that received beacon transmissions 120 including the beacon ID 502. The gateway 106A-B may then store assign each node ID 506A-F as a subnode of its associated floor ID 504A-C and may store the signal strengths 508A-F as subnodes of their respective node IDs 506A-F.

Figure 6:
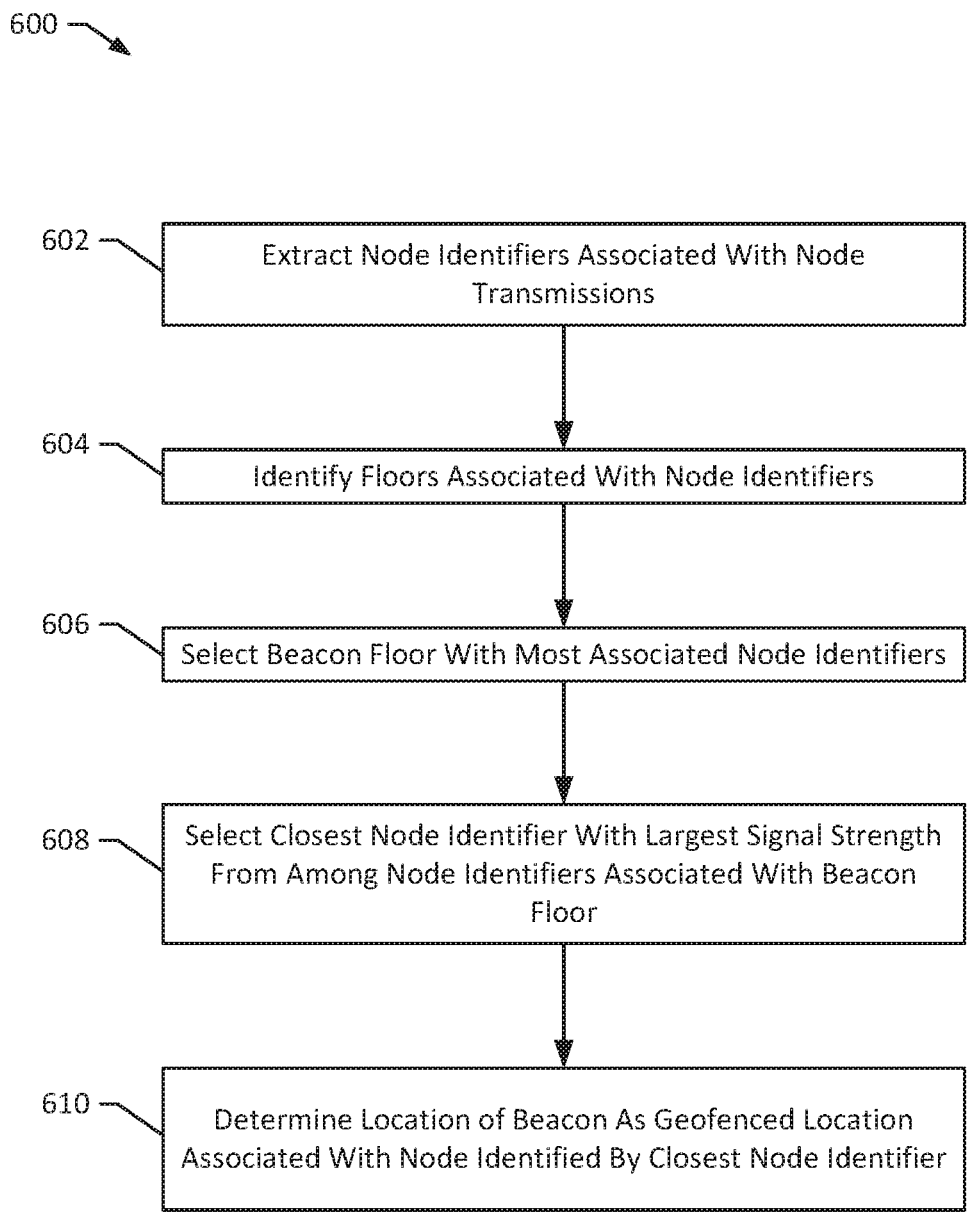
FIG. 6 illustrates a method according to an exemplary embodiment of the present disclosure.

FIG. 6 illustrates a method 600 according to an exemplary embodiment of the present disclosure. The method 600 may be performed to generate a beacon location tree 110, 500 for a beacon 118A-E. For example, the gateway 106A-B may generate a beacon location tree 110, 500 for each common beacon identifier 502 identified during performance of the method 400. In particular, the gateway 106A-B may generate the beacon location tree 110, 500 at black 510 to determine the location of the beacon 118A-E associated with the common beacon identifier 502. In other implementations, the gateway 106A-B may generate a beacon location tree 110, 500 for each beacon ID 204, 502 included in received node transmissions 114.

The method 600 may be performed by a computer system, such as the system 100 For example, the method 600 may be implemented by one or more nodes 112A-E, gateways 106A-B, and cloud servers 102. The method 600 may also be implemented by a set of instructions stored on a computer readable medium that, when executed by a processor, cause the computer system to perform the method. Although the examples below are described with reference to the flowchart illustrated in FIG. 6, many other methods of performing the acts associated with FIG. 6 may be used. For example, the order of some of the blocks may be changed, certain blocks may be combined with other blocks, one or more of the blocks may be repeated, and some of the blocks described may be optional.

The method 600 may begin with the gateway extracting node identifiers associated with node transmissions (block 602). For example, the gateway 106A-B may receive more than one node transmission 114 from nodes 112A-E during the gateway cycle period and may extract the node IDs 204 from the node transmissions 114 received during the gateway cycle period. In particular, the gateway 106A-B may extract the node IDs 204, 506A-F from node transmissions 114 containing the common beacon identifier 502.

The gateway may then identify floors associated with the node identifiers (block 604). For example, for each node ID 204, 506A-F, the gateway 106A-B may query a database storing associations between node IDs 204, 506A-F. The database may store floor IDs 504A-C identifying the floor of a facility 300 on which the node corresponding to each node ID 506A-F is deployed. The gateway 106A-B may collect the floor IDs 504A-C associated with each node ID 204, 506A-F and may group the node IDs 206, 506A-F by floor ID 504A-C. For example, in implementations where the gateway 106A-B generates a beacon location tree 110, 500, the gateway 106A-B may store the node IDs 506A-F as subnodes of the corresponding floor IDs 504A-C in the beacon location tree 110, 500, as depicted in FIG. 5.

The gateway may then select a beacon floor with the most associated node identifiers (block 606). For example, the gateway 106A-B may select a beacon floor from among the floor IDs 504A-C. The beacon floor may identify the floor on which the beacon 118A-E associated with the common beacon identifier 502 is located. The gateway 106A-B may select the beacon floor by determining the number of node identifiers 506A-F are associated with each floor ID 504A-C (e.g., in the groups discussed above and generated at block 606. For example, where the gateway 106A-B generates the beacon tree 500, the gateway 106A-B may determine the floor ID 504A as corresponding to the beacon floor because the floor ID 504A has three corresponding node IDs 506A-C, while the floor ID 504B has one corresponding node ID 506D and the floor ID 504C has two corresponding node IDs 506E-F. Notably, in this example, the gateway 106A-B selects the floor ID 504A even though the node ID 506D corresponding to floor ID 504B has a stronger signal strength 508D of 90% than any of the node IDs 506A-C corresponding to the floor ID 504A. The conventional techniques discussed above that rely on heuristics such as signal strength may mistakenly select the floor ID 504B and the node ID 506D as the location of the beacon corresponding to the beacon ID 502. By incorporating information across all of the nodes 506A-F and comparing the total count of receiving nodes on for each floor, the method 600 and the gateway 106A-B is able to more accurately determine the correct beacon floor for the common beacon identifier 502.

The gateway may then select a closest node identifier with the largest signal strength from among the node identifiers associated with the beacon floor (block 608). For example, the gateway 106A-B may analyze the node IDs 204, 506A-F associated with the floor ID 504A-C of the beacon floor and may select the closest node identifier as the node ID 204, 506A-F with the largest associated signal strength 508A-F. Continuing the above example, where the beacon floor corresponds to the floor ID 504A, the gateway 106A-B may analyze the signal strengths 508A-C associated with the node IDs 506A-C and may determine the that signal strength 508A of 80% is the largest. The gateway 106A-B may then select the node ID 506A corresponding to the signal strength 508A as the closest node identifier.

The gateway may then determine the location of the beacon as a location associated with the node identified by the closest node identifier (block 610). For example, the gateway 106A-B may determine the location by identifying a location associated with the node ID 204, 506A-F selected as the node identifier. For example, as previously discussed one or both of the gateway 106A-B and the cloud server 102 may store location information associated with the node IDs 204, 506A-F. The gateway 106A-B may query this stored location information to identify a location 214, 216 associated with the node ID 204, 506A-F selected as the closest node identifier. The gateway 106A-B may then associate the determined location 214, 216 of the closest node identifier with the common beacon identifier 502 and may add this location 214, 216 to a gateway transmission 108. In implementations where the cloud server 102 stores associated location information and the gateway 106-B does not, the gateway 106A-B may instead include the closest node identifier in the gateway transmission 108 and the cloud server 102 may determine the location associated with the closest node identifier as the location of the common beacon identifier 502.

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:
1. A system comprising:
a plurality of nodes configured to:
receive beacon transmissions from a plurality of beacons, wherein the beacons are associated with a plurality of assets and the beacon transmissions contain a beacon identifier; and transmit a node transmission including a beacon identifier, node identifier, and signal strength responsive to receiving a beacon transmission; and a gateway configured to:
receive a plurality of node transmissions from the plurality of nodes;
identify a subset of the node transmissions that include a common beacon identifier; and
determine a location of a beacon of the plurality of beacons associated with the common beacon identifier by:
extracting a plurality of node identifiers associated with the subset of the node transmissions;
identifying one or more floors associated with the plurality of node identifiers;
selecting a beacon floor of the one or more floors with the most associated node identifiers;
selecting a closest node identifier with the largest signal strength from among one or more of the plurality of node identifiers associated with the beacon floor; and
determining the location of the beacon as a location associated with the node of the plurality of nodes identified by the closest node identifier, wherein determining the location of the beacon includes generating a beacon location tree that subdivides the plurality of node identifiers according to one or more floor identifiers associated with the plurality of node identifiers.

2. The system of claim 1, wherein the gateway is configured, when generating the beacon location tree, to:
set the common beacon identifier as a parent node of the tree;
set each of the one or more floor identifiers as floor nodes of the common beacon identifier; and
set, for each floor identifier, node identifiers associated with the floor identifier as subnodes of the floor identifier.

3. The system of claim 1, wherein each of the plurality of nodes are configured to:
receive a plurality of wireless signals;
filter the plurality of wireless signals to identify a beacon transmission;
determine a signal strength for the beacon transmission; and
transmit the beacon identifier, the signal strength, and a node identifier of the node to the gateway.

4. The system of claim 3, wherein each of the plurality of nodes receives the plurality of wireless signals over a node cycle period and filters the plurality of wireless signals at the end of the node cycle period.

5. The system of claim 4, wherein the node cycle period is less than or equal to 2 minutes.

6. The system of claim 3, wherein the plurality of wireless signals includes a plurality of beacon transmissions including a plurality of beacon identifiers, and each of the nodes are configured to:
determine a plurality of signal strengths corresponding to the plurality of beacon transmissions; and
transmit each of the beacon identifiers of the beacon transmission in association with a corresponding signal strength of the plurality of signal strengths and the node identifier of the node.

7. The system of claim 6, wherein at least a subset of the beacon identifiers are transmitted together.

8. The system of claim 1, wherein the nodes are configured to transmit the node transmission according to the message queuing telemetry transport protocol.

9. The system of claim 1, wherein the gateway is configured to receive the plurality of node transmissions over a gateway cycle period.

10. The system of claim 9, wherein the gateway cycle period is less than or equal to 10 minutes and is preferably less than or equal to 5 minutes.

11. The system of claim 1, wherein the gateway is further configured to transmit a gateway transmission including beacon identifiers and associated beacon locations, and wherein the system further comprises a cloud server configured to:
receive a plurality of gateway transmissions during a cloud server cycle period; and
determine a final location for beacons based on a most common beacon location associated with received beacon identifiers.

12. A method comprising:
receiving, at a plurality of nodes, beacon transmissions from a plurality of beacons, wherein the beacons are associated with a plurality of assets and the beacon transmissions contain a beacon identifier;
transmitting, from the plurality of nodes, a plurality of node transmissions, each node transmission including a beacon identifier, a node identifier, and a signal strength responsive to receiving the beacon transmissions;
receiving, at a gateway, the plurality of node transmissions from the plurality of nodes;
identifying a subset of the node transmissions that include a common beacon identifier; and
determining a location of a beacon of the plurality of beacons associated with the common beacon identifier by:
extracting a plurality of node identifiers associated with the subset of the node transmissions;
identifying one or more floors associated with the plurality of node identifiers;
selecting a beacon floor of the one or more floors with the most associated node identifiers;
selecting a closest node identifier with the largest signal strength from among one or more of the plurality of node identifiers associated with the beacon floor; and
determining the location of the beacon as a location associated with the node of the plurality of nodes identified by the closest node identifier, wherein determining the location of the beacon includes generating a beacon location tree that subdivides the plurality of node identifiers according to one or more floor identifiers associated with the plurality of node identifiers.

13. The method of claim 12, wherein generating the beacon location tree comprises:
setting the common beacon identifier as a parent node of the tree;
setting each of the one or more floor identifiers as floor nodes of the common beacon identifier; and
setting, for each floor identifier, node identifiers associated with the floor identifier as subnodes of the floor identifier.

14. The method of claim 12, wherein receiving the beacon transmissions and transmitting the plurality of node transmissions further comprises:
receiving a plurality of wireless signals;
filtering the plurality of wireless signals to identify the beacon transmission;

determining the signal strength for the beacon transmission; and transmitting the beacon identifier, the signal strength, and a node identifier of the node to the gateway.

15. The method of claim 14, wherein the plurality of wireless signals includes a plurality of beacon transmissions including a plurality of beacon identifiers, and wherein the method further comprises:

determining a plurality of signal strengths corresponding to the plurality of beacon transmissions; and transmitting each of the beacon identifiers associated with a corresponding signal strength of the plurality of signal strengths and the node identifier of the node.

16. The method of claim 15, wherein at least a subset of the beacon identifiers are transmitted together.

17. The method of claim 12, further comprising transmitting gateway transmissions including beacon identifiers and associated beacon locations;

receiving, at a cloud server, a plurality of gateway transmissions during a cloud server cycle period; and determining a final location for beacons based on a most common beacon location associated with received beacon identifiers.

18. A method comprising:

receiving, at a gateway, a plurality of node transmissions including a corresponding beacon identifier, node identifier, and signal strength;

identifying a subset of the node transmissions that include a common beacon identifier;

generating a beacon location tree for the common beacon identifier by:

extracting a plurality of node identifiers associated with the subset of the node transmissions;

identifying one or more floor identifiers associated with the plurality of node identifiers;

setting the common beacon identifier as a parent node of the tree;

setting each of the one or more floor identifiers as floor nodes of the common beacon identifier; and setting, for each floor identifier, node identifiers associated with the floor identifier as subnodes of the floor identifier; and determining a location of a beacon of a plurality of beacons associated with the common beacon identifier based on the beacon location tree by:

selecting a beacon floor corresponding to the floor node with the largest number of subnodes;

selecting a closest node identifier corresponding to the node identifier of the subnode of the beacon floor with the largest signal strength; and determining the location of the beacon as a location associated with the node of the plurality of nodes identified by the closest node identifier.

* * * * *